United States Patent [19]

Orii

[11] Patent Number: 5,093,892
[45] Date of Patent: Mar. 3, 1992

[54] MOTOR SPEED CONTROL SYSTEM

[75] Inventor: Akira Orii, Hachioji, Japan

[73] Assignee: Janome Sewing Machine Industry Co., Ltd., Tokyo, Japan

[21] Appl. No.: 411,322

[22] Filed: Sep. 22, 1989

[30] Foreign Application Priority Data

Sep. 22, 1988 [JP] Japan .................. 63-236283[U]

[51] Int. Cl.$^5$ .......................................... H02P 5/168
[52] U.S. Cl. ..................................... 388/815; 388/904; 388/907.5
[58] Field of Search .................. 388/809–815, 388/800–802, 904, 907.5; 364/550, 551.01, 551.02, 552–554, 570, 571.02, 571.04, 571.07

[56] References Cited

U.S. PATENT DOCUMENTS

| 4,719,582 | 1/1988 | Ishida et al. | 364/497 X |
| 4,777,585 | 10/1988 | Kokawa et al. | 364/184 X |
| 4,809,175 | 2/1989 | Hosaka et al. | 364/424.01 |
| 4,839,823 | 6/1989 | Matsumoto | 364/550 X |
| 4,842,342 | 6/1989 | Takahashi | 364/424.01 X |

Primary Examiner—William M. Shoop, Jr.
Assistant Examiner—David Martin
Attorney, Agent, or Firm—Dann, Dorfman, Herrell and Skillman

[57] ABSTRACT

There is disclosed a motor speed control system particularly applicable to control sewing machine operation, including an evaluator to compare a preset speed of revolution value and an actual speed of revolution value to output one signal representing a deviation between the two speeds and the other representing a rate of increase or decrease of the actual speed of revolution within a predetermined short interval. In response to these parameter signals, one of the stored fuzzy rules is selectively applied to output an appropriate control signal to change electric power supplied to a motor as needed to adjust the speed of revolution toward the preset revolution with quick responsivity and smooth transition.

7 Claims, 3 Drawing Sheets

MOTOR SPEED CONTROL SYSTEM

BACKGROUND OF THE INVENTION

The present invention relates to a novel speed control system for controllinq a DC motor, and in particular to a motor speed control system having improved stability of speed control against load fluctuation. The motor speed control system according to this invention is particularly applicable in the art of electrically driven sewing machines for controlling revolution oi an upper drive shaft driven by an electromotor.

As having been well known in the art, a remote-controller is detachably connected to an electric or electronic sewing machine and operated by the sewing machine operator to control revolution of a motor driven to rotate an upper drive shaft and therefore to reciprocate a fabric penetrating needle, to thereby control operating speed of the sewing machine.

When the revolution of the sewing machine motor is under control of a prior art control system, even with so-called PI (proportion-integration) or PID (proportion-integration differential) control system, speed of rotation of an actual revolution will be greatly varied due to load fluctuation occuring during rotation of the motor especially at low speeds. More particularly, the actual rate of revolution will be much decreased when a pointed end of the needle just enters a fabric, and the rate of revolution again becomes greater when the needle is pulled apart from the fabric. Such sudden variation of the motor revolution would not only make a harsh and unpleasant noise during sewing machine operation but also make it difficult to stop the sewing machine at a predetermined needle position under precise control. Because the load fluctuation arising during sewing machine operation will be so great, a control system employed to control the sewing machine motor must provide improved characteristics as compared with similar control systems conventional in general electric motors. Undesirable variation of the rate of motor revolution would also be caused by unstabilized voltage values supplied to the motor. Further, the sewing machine motor revolution may be selected as desired by the operator within a considerable range so that the control system for the sewing machine motor should control the motor revolution to follow a change in the selected revolution with high reliability.

SUMMARY OF THE INVENTION

It is therefore an object of this invention to obviate the above-mentioned disadvantages of the prior art motor speed control systems.

Another object of the present invention is to provide a novel motor speed control system especially for an electrically driven sewing machine which is capable of controlling a motor revolution with high stability against load fluctuations.

According to an aspect of this invention there is provided a motor speed control system comprising means for evaluating an actual revolution of a motor in comparison to a reference revolution, a first parameter representing a deviation between the actual speed of revolution and the reference revolution and a second parameter representing a rate of change in the actual revolution being output from the evaluating means, and means for applying one of prescrihed fuzzy rules in response to the first and second parameters to thereby output a control command to the motor for changing the motor speed of revolution. Each fuzzy rule comprises a combination of a first membership function regarding the first parameter, a second membership function regarding the second parameter and a third membership function regarding the control command. A specific value of the control command is determined in correspondence with one or both of membership values obtained in the first and second membership functions, and in a preferred embodiment the control command ;s determined depending upon a greater membership values in accordance with the MAX rule in the known iuzzy theory.

The control system according the invention has been made by practical application of the known fuzzy theory which was proposed by professor Lotfi A. Zadeh, California Univ. in 1964 for dealing with a set of ambiguous conceptions or "fuzzy set". Fuzzy set is defined by a specific "membership function" to read out a "membership value" ranging between 0 and 1.

BRIEF DESCRIPTION OF THE DRAWINGS

Further obJects and advantages of this invention can be fully understood from the following detailed description when read in conjunction with the accompanying drawings in which;

FIG. 2 is an explanatory view showing a plurality of fuzzy rules applicable in the embodiment.

DETAILED DESCRIPTION OF THE PREFERRED EMBODIMENT

Figure 1:
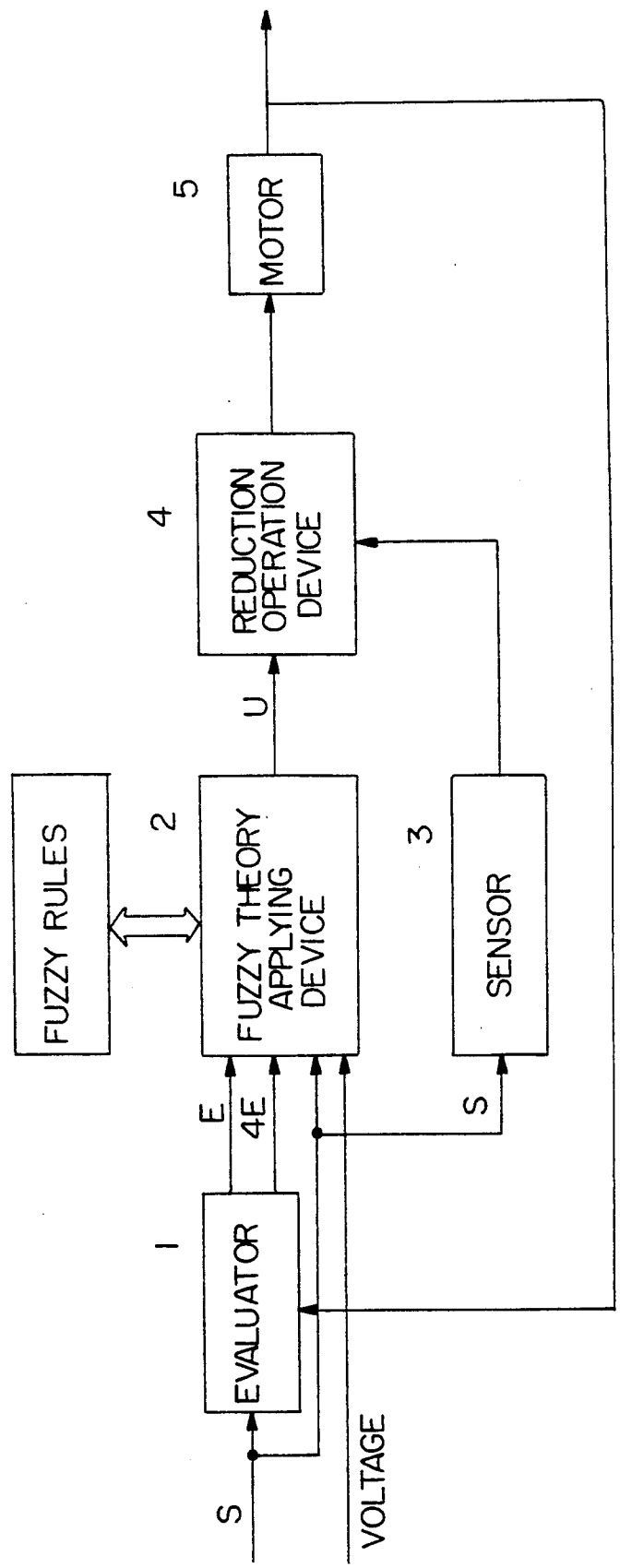
FIG. 1 diagram illustrating an overall arrangement of a motor speed control system embodying the invention.

A motor speed control system embodying the present invention is applied to an electronic sewing machine which includes, as well known in the art, an electromotor, an upper drive shaft connected to the electromotor and driven thereby and a stitching needle connected to the upper drive shaft and reciprocated in a vertical direction along with rotation of the upper drive shaft. Revolution of the motor and therefor revolution of the upper drive shaft which governs operating speed of the sewing machine may be set to a desired value by operation of a remote-controller detachably connected to the sewing machine body.

The speed control system in this embodiment cooperates with the remote-controller. A selected value S of the upper drive shaft spaced of revolution which has been selected by the remote-controller is output to an evaluator 1. To the evaluator 1 is also input another value representing the actual revolution of the upper drive shaft which is detected at about 3 milliseconds intervals by a detector or sensor means at the upper drive shaft of a conventional arrangement, here represented by the feedback line from the motor 5 to the evaluator 1. Upon receiving these inputs, the evaluator 1 outputs two membership values, a first one representing a deviation or difference between the selected revolution S and the actual revolution and a second one representing rate of change of the speed of revoltuion. These membership values, and a voltage value proportional to a power source voltage supplied to the sewing machine and the selected speed of revolution S as well, are supplied to a fuzzy theory applying device 2 which is operated in accordance with one of prescribed fuzzy rules to output a control command U a reduction operation device 4. The reduction operation device 4 also cooperates with a variation detector 3 and operates such that when there is no change in the selected speed of revolution S the control command U will pass therethrough without adjustment to the output to an object of control, which is in this embodiment a DC motor 5 controlled by pulse width modulation (PWM) to drive an upper drive shaft, whereas the control command signal U is reduced in the case of the selected speed of revolution S being varied to another value by the sewing machine operator's manipulation. The reason why an output value of the control command U is revised to a reduced value in the case of a change in the selected speed of revolution S is that a sudden change of the motor speed of revolution should be prevented, providing smooth and gradual transition of the actual revolution toward a newly selected revolution.

The fuzzy theory applying device 2 is divided into two sections. A first section stores a plurality of prescribed fuzzy rules and is operated in response to input values, namely the deviation E, the deviation change $\Delta E$ and the actual speed of revolution S, to select one oi the fuzzy rules to be applied. At a second section, the selected fuzzy rule is applied to three input values, namely the deviation E, the deviation change AE and the voltage value, and the result of fuzzy calculation will be output as the control command U. The control command U is a signal commanding that an electric power supplied to the motor be increased or decreased by changing the pulse width of PWM control.

In preparing fuzzy rules, investigation is made as to how the electric power should be increased or decreased for this particular motor and driven system so as to stabilize the motor revolution aga;nst change in load, so called "membership functions" are derivedfor the respective combination of the deviation E and the deviation change $\Delta E$, and for the utput control command U to correct motor speed, thereby theoretically making a plurality of fuzzy rules, one of which is selectively applied to a corresponding operation condition. The respective fuzzy rules selectively operates on a first membership function regarding the deviation E, a second membership function regarding the deviation change $\Delta E$ and a third membership function regarding the control command U to be output responsive to either one of membership values determined by the first and second membership functions. In this embodiment, eiether one of the membership valus having a greater value is adopted in accordance with so-called MAX rule in the known fuzzy theory. That is, and the output control command U is determined in correspondence with the greater (the maximum) of said membership value, thereby providing guick responsiveness and smooth control. The respective fuzzy rules are theorically prepared and then be put into practice using calculated respective membership functions, which are automatically revised as needed, as when voltage levels change for more accurate and smooth control.

FIG. 2a, 2b, 2c, 2d, 2e and 2f gualitatively illustrate a series of fuzzy rules which have been determined ;n a manner described in the preceeding paragraph.

Figure 2A:
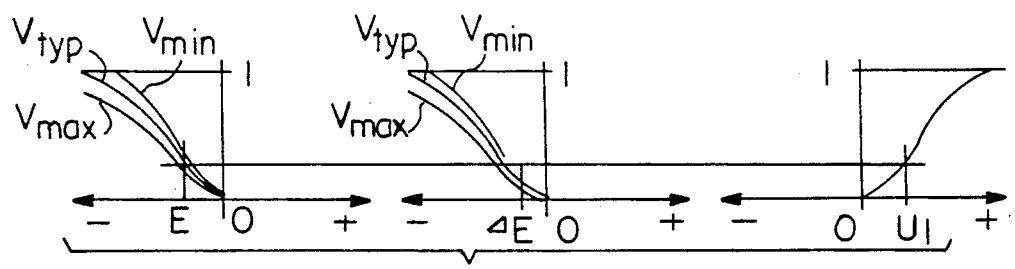
FIG. 2a is a group of related plots representing fuzzy Rule 1.

Rule 1 is applied to a case wherein the deviation E is negative (E<0) (which means that the speed of actual revolution is lower than the selected value S) and the deviation change $\Delta E$ is negative ($\Delta E<0$) (which means that the actual speed of revolution is reducing). In the respective graphs seen in FIGS. 2a showing the membership functions regarding the deviation E and the deviation change $\Delta E$ which are parameters on the abscissa, membership values may be obtained between 0 to 1 along the ordinate. Among them, a greater membership value which in this example corresponds to the deviation E is adopted and an output signal $U_1$ of the control command U is determined in correspondence with the said membership value. As a result of Rule 1 having been applied, the control command $U_1$ having a positive value is output to increase the electric power supplied to the motor.

In all fuzzy rules, the membership functions regarding the deviation E and the deviation change $\Delta E$ will be varied with the voltage supplied to the motor. In FIG. 2, the membership functions represented as Vtyp will be the case wherein a reference voltage is applied and those represented as Vmax and Vmin will be applicable to the cases having the maximum and minimum voltage. For easier understanding, a specific membership function determined by also taking the supplied voltage into consideration is shown in the respective graphs.

Figure 2B:
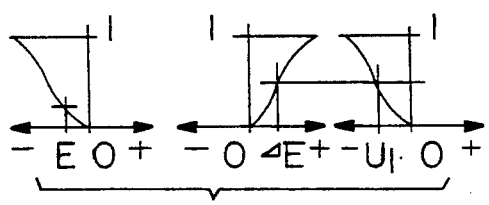
FIG. 2b is a group of related plots representing fuzzy Rule 2-1.
Figure 2C:
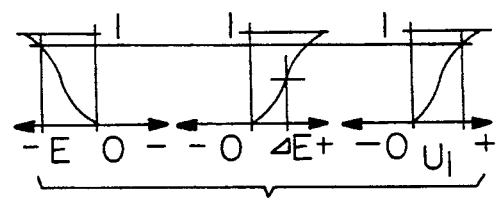
FIG. 2c is a group of related plots representing fuzzy Rule 2-2.

Rule 2-1 illustrated in FIG. 2b and Rule 2-2 illustrated in FIG. 2c are applied when the deviation E is negative and the deviation change $\Delta E$ is zero or positive meaning that the actual speed of revolution is increasing unchanging but has not yet reached the selected value S. This case is further divided into two cases depending upon the selected value S which is also input directly to the fuzzy rule applying device 2. More particularly, when the selected value S is 200 rpm or less, for example, meaning that the sewing machine is operating at substantially a slow speed or when the speed of revolution is increasing rapidly leading the deviation change $\Delta E$ of a large negative value, Rule 2-1 is applied so that the control command $U_1$ having a ne9ative value corresponding to a larger membership value is output to reduce the electric power supplied to the motor. This will gradually and smoothly increase the speed of revolution toward the selected value without much overrun. Meanwhile when the selected value S exceeds 200 rpm and when the actual speed of revolution increases at a relatively slow rate leading the deviation change AE of a relatively small positive value, Rule 2-2 is applied so that the control command $U_1$ of substantially a large positive value determined by a larger membership value is output to increase the supplied electric power. This will enhance prompt elevation of the speed of revolution toward the selected value. Application of Rule 2 2 is always followed by Rule 2-1.

Figure 2D:
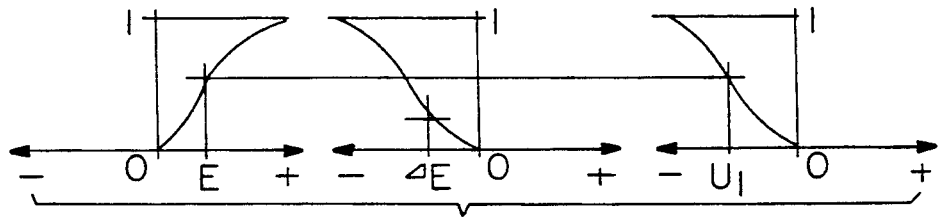
FIG. 2d is a group of related plots representing fuzzy Rule 3-1.
Figure 2E:
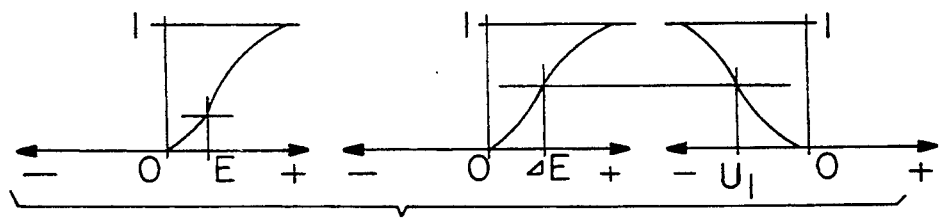
FIG. 2e is a group of related plots representing fuzzy Rule 3-2.

Rule 3-1 as illustrated in FIG. 2d is applied when the deviation E is positive or zero (E<0) and the deviation change $\Delta E$ is negative ($\Delta E<0$) namely when the actual speed of revolution is reducing but still larger than the selected value, the control command $U_1$ of a negative value corresponding to a larger membership value is output. The supplied power is thus reduced to assure a prompt return to the selected value. Rule 3-2 as illustrated in FIG. 2e is applied when the deviation E and the deviation change ΔE are both positive or zero (E≧0, ΔE≧0). In this case, the control command $U_1$ of a negative value determined by a larger membership value is output to reduce the supplied power, as in the case of Rule 3-1.

Although in this embodiment Rule 3-1 and Rule 3-2 are selectivelY applied depending upon positive and negative of the deviation change ΔE, a single rule may be prepared and applied when the deviation E is positive or zero in which case a membership function regarding the deviation change ΔE is determined depending upon the absolute value thereof |ΔE|.

Rule 4 is applied when the deviation E has an extreme negative value meaning that the sewing machine operation is almost at standstill or in a locked condition and the speed of revolution tends to further decrease. This will be the case, for example, where the sewing machine needle descends to just penetrate through a material workpiece which is of a considerable thickness or comprises plural sheets superposed one another, but a motor used provides a torgue insufficient for complete penetration. In such case, the control command $U_1$ is generated to reduce the supplied power to the minimum value. After a while, Rule 1 is applied to increase the supplied power toward the maximum value. By repeating such operation, intermittent downward force may be given to the needle whereby a thick workpiece could be stitched with a relatively small torgue motor.

Figure 3:
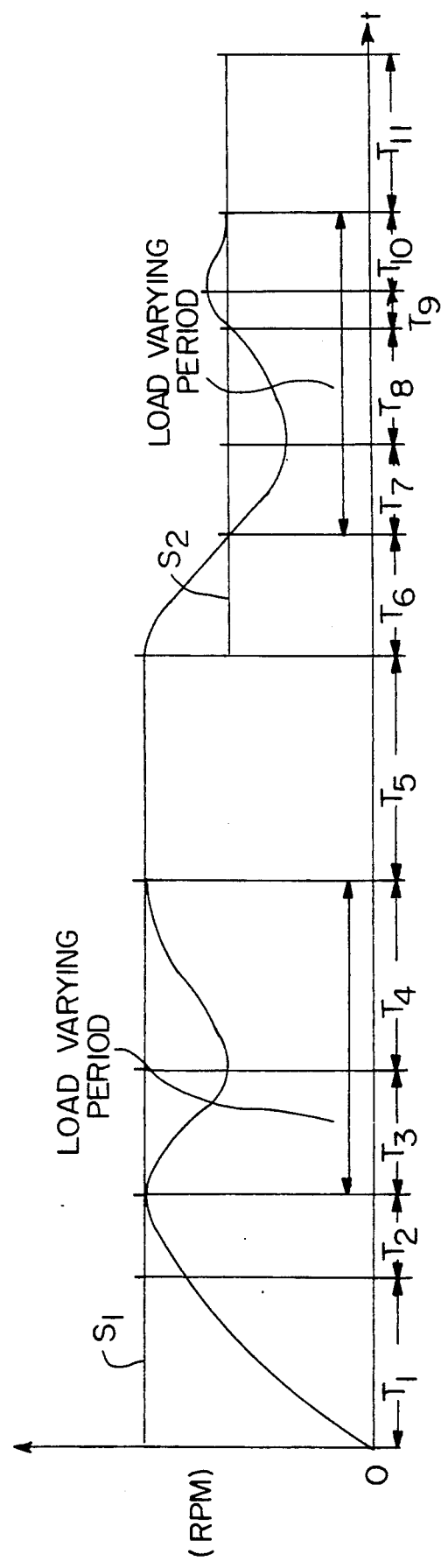
FIG. 3 is a graph showing an exemplified result of the control operation achieved by the embodiment.

An example of how motor speed of revolution can be controlled is shown in FIG. 3 by utilizing teh abovementioned fuzzy rules. Although it may be seen in this drawing that the speed of revolution varies in a wider range even after control, actually, the motor speed of revolution can be controlled to be substantially egual to the selected speed value S without considerable differences.

Now, a motor starts to rotate. During a starting period $T_1$; no fuzzy rule is applied and otherwise a control command $U_1$ commanding that the revolution be increased to a selected value $S_1$ is output, upon which the revolution increases toward the selected value $S_1$ in dependence upon motor characteristics and under load in a sewing machine. Rule 2-1 and Rule 2-2 which will be applied in $S_1$ by nature are nullified during the initial stage of control operation for prompt elevation of the motor revolution.

When the actual revolution reaches close to the selected value $S_1$ or a predetermined period of time has passed, the fuzzy rule operation will come into practice and Rule 2-2 followed by Rule 2-1 are applied in $T_2$. Thus, the actual speed of revolution can be Increased promptlY (by Rule 2-2) and then smoothly (by Rule 2-1) toward the selected value $S_1$.

Now, the needle 3ust penetrates the workpiece at a time $T_3$ when the actual revolution has reached the selected value $S_1$, so that the actual revolution tends to lower to have a value again below the selected value $S_1$. Thus, Rule 1 is applied during $T_3$ so that the control command $U_1$ is output to increase the supplied power to thereby prevent further lowering of the revolution.

Load arising during the needle penetration will be maximized at time $T_4$ when the needle penetrates the workpiece to a certain distance, and thereafter load tends to increase. Thus, Rule 2-1 or Rule 2-2 is selectively applied during $T_4$.

The actual revolution coincides with the selected value $S_1$ during time $T_5$ so that Rule 3-2 is applied (wherein E=0 and ΔE=0) to output the control command $U_1$ commanding that the supplied power be maintained without change. This condition will be maintained until any load change arises or the selected value $S_1$ is changed.

Now the selected value $S_1$ is changed to another smaller value $S_2$ which would be reguired by the sewing machine operator when he intends to produce darning stitches or complicated ornamental stitche patterns, for example. Then, Rule 3-1 is applied during this time $T_6$ to decrease the supplied power to lower the actual revolution toward the newly selected value $S_2$. During such control, an output value of the control command $U_1$ is reduced by the reductlon operation device 4 in response to a signal generered from the detector 3.

When the actual speed of revolution becomes lower than the selected value $S_2$ by load change occuring with the needle penetration, application of Rule 1 outputs the power increasing command U; so as to try to prevent further decrease of the actual revolution during time $T_7$, as in during $T_3$. After passing the maximum load point, the actual speed of revolution is turned to increase, during which time ($T_8$) Rule 2-1 or 2-2 is applied as in during $T_4$. As a result of applying one of these rules, the speed of revolution may overrun beyond the selected value $S_2$, in which case Rule 3-2 is first applied during time $T_9$ and then Rule 3-1 is applied during time $T_{10}$, thereby returning the revolution to the selected value $S_2$. After that, there will be no change in the supplied power during time $T_{11}$, as in $T_5$.

Although the invention has been described in conjunction with a specific embodiment thereof, it is to be understood that many variations and modifications may be made without departing from spirit and scope of the invention as defined in the appended claims.

What is claimed is:

1. Motor speed control system comprising evaluating means for comparison of signals representative of the actual speed of revolution of a motor to a reference speed of revolution and for generating of a first parameter representing a deviation between the actual speed ore volution and the reference speed of revolution and for generating a second parameter representing a rate of change in thea ctual speed of revolution, means for storing one of a set of prescribed fuzzy rules which are applicable under specified ranges of the first and second parameters and which correlate various possible values of the respective parameters with various values of control command output, and means responding to the rspective ranges detected for selecting and applying one of said fuzzy rules and in rseponse to the values of first and second parameters to output a control command to the motor for changing the motor speed of revolution, each fuzzy rule comprising a combination of a first membership function correlated with the first parameter, a second membership function correlated with the second parameter, a third membership function providing values of control command for each membership value and a basis for selecting which of the the first and second membership functions shall determine the third, each of the memberhsip functions being appropriate to the motor being controlled, such that a specific value of control command is determined from the control command membership function to correspond with a value of membership values obtained from one of the first and second membership functions and determined by the selected fuzzy rule.

2. The motor speed control system according to claim 1 wherein said control command output has a specific value determined in correspondence with a memberhsip value of either the first and second membership functions of the selected fuzzy rules.

3. Speed control system for controlling speed of revolution of an upper drive shaft driven by a motor in a sewing machine, comprising speed setting means for setting a speed of revolution of the upper drive shaft to a reference value as desired by a sewing machine operator, sensor means for detecting an actual revolution of the upper drive, evaluating means for substantially continuously comparing the actual speed of revolution with respect to the reference speed of revolution to output a first parameter representing the difference between these two speeds of revolution and a second parameter representing a time rate of change in the actual speed of revolution within a predetermined interval, memory means for storing a plurality of prescribed fuzzy rules for various predetermined ranges of first and second parameters, each comprising a first membership function for determining a first membershi value corresponding to each specific detected value of the first parameter, a second membership function for determining a second membership value corresponding to each specific value of the second parameter and a third membership function for determining a control command value for each specific selected membership value, and rule selecting means for selecting one of the prescribed fuzzy rules among those stored in said memory means in response to the first and second parameters input thereto and fuzzy theory applying means for applying said selected fuzzy rule so that results of fuzzy theory application will provide output to the motor of a control command having a specific value determined in the third membership function depending upon the selected on of teh first and second memberhsip values of the selected fuzzy rule, thereby changing the motor revolution and the actual revolution of the upper drive shaft.

4. The speed control system according to claim 3 wherein a specific value of the control command is determined in correspondence with the greater membership value of the first and second parameters.

5. The speed control system according to claim 3 wherein the control command is a signal commanding that electric power supplied to the motor be increased or decreased.

6. The speed control system according to claim 3 which further comprises reduction operation means for reducing the value of the control command when the reference speed of revolution is changed, said reduction operation being made inoperative when the second parameter is reduced below a predetermined value or after a predetermined period of time.

7. The speed control system according to claim 3 wherein the first and second memberhsip functions of the fuzzy rules stored in said memory means are varied with voltage supplied to the motor, and in addition to the first and second parameters a value corresponding to the voltage is also input to said rules selecting means to vary the membership functions in a predetermined manner in accordance with the fuzzy rules.

* * * * *

UNITED STATES PATENT AND TRADEMARK OFFICE
CERTIFICATE OF CORRECTION

PATENT NO. : 5,093,892

DATED : March 3, 1992

INVENTOR(S) : AKIRA ORII

It is certified that error appears in the above-identified patent and that said Letters Patent is hereby corrected as shown below:

Column 1, line 11, "oi" should read --of--;

line 30, delete "apart";

line 63, after "reference" insert --speed of--;

line 64, after "actual" insert --speed of--;

line 66, "prescrihed" should read --prescribed--.

Column 2, line 9, ";s" should read --is--;

line 11, "iuzzy" should read --fuzzy--;

line 26, after "FIG. 1" insert --is a block--;

Lines 27 and 28, beginning with "FIG. 2 is a", delete both lines;

lines 31, 33, 35, 37 and 39, "group" should read --pair--;

line 61, "spaced" should read --speed--.

Column 3, line 11, after "U" insert -to--;

line 33, "oi" should read --of--;

line 36, "AE" should read --$\Delta$E--;

line 60, "eiether" should read --either--; "valus" should read --values--;

line 62, delete "and";

line 65, "value" should read --values--.

UNITED STATES PATENT AND TRADEMARK OFFICE
CERTIFICATE OF CORRECTION

PATENT NO. : 5,093,892

DATED : March 3, 1992

INVENTOR(S) : AKIRA ORII

It is certified that error appears in the above-identified patent and that said Letters Patent is hereby corrected as shown below:

Column 4, line 4, ";in" should read --in--;

line 7, "speed of" should have been inserted after "actual" to read --the actual speed of revolution--;

line 11, "FIGS." should read --FIG.--;

line 36, before "un-" insert --(or--;

line 37, after "changing" insert a parenthesis ")";

line 46, "ne9ative" should read --negative--;

line 53, "AE" should read --$\Delta E$--;

line 59, "2 2" should read --2-2--;

line 62, "(E<0)" should read --(E$\geq$0)--.

Figure 2F:
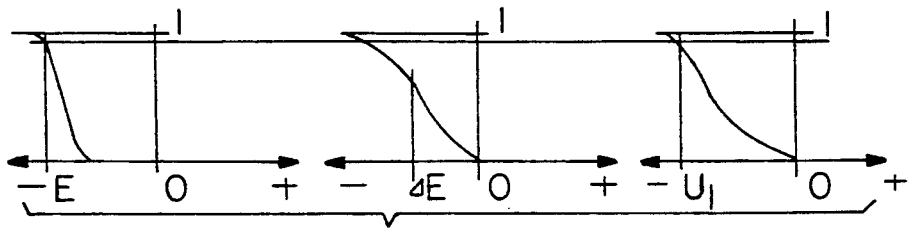
FIG. 2f is a group of related plots representing fuzzy Rule 4.

Column 5, line 8, "selectivelY" should read --selectively--;

line 14, after "4" insert --as illustrated in FIG. 2f--;

line 22, "torgue" should read --torque--;

line 29, "torgue" should read --torque--;

line 31, "teh" should read --the--;

line 35, "egual" should read --equal--;

line 40, "$U_1$" should read --$U_0$--;

line 52, "Increased" should read --increased--;

line 53, "promptlY" should read --promptly--;

UNITED STATES PATENT AND TRADEMARK OFFICE
CERTIFICATE OF CORRECTION

PATENT NO. : 5,093,892

DATED : March 3, 1992

INVENTOR(S) : AKIRA ORII

It is certified that error appears in the above-identified patent and that said Letters Patent is hereby corrected as shown below:

Column 5, line 55, "3ust" should read --just--;
         line 65, "Thus." should read --Thus,--.
Column 6, line 14, "reduct1on" should read --reduction--;
         line 19, "U;" should read --$U_1$--.
Column 6, Claim 1, line 43, "ore volution" should read --of revolution--;
         line 45, "thea ctual" should read --the actual--;
         line 51, "rspective" should read --respective--.
Column 7, Claim 3, line 22, "membershi" should read --membership--.

UNITED STATES PATENT AND TRADEMARK OFFICE
CERTIFICATE OF CORRECTION

PATENT NO. : 5,093,892
DATED : March 3, 1992
INVENTOR(S) : Akira Orii

It is certified that error appears in the above-indentified patent and that said Letters Patent is hereby corrected as shown below:

Column 8, Claim 3, line 5, "on of teh" should read --one of the--.

Column 8, Claim 7, line 29, "rules" should read --rule--.

Signed and Sealed this

Twenty-fourth Day of August, 1993

Attest:

BRUCE LEHMAN

Attesting Officer     Commissioner of Patents and Trademarks